United States Patent [19]

Hasegawa et al.

[11] Patent Number: 4,820,570
[45] Date of Patent: Apr. 11, 1989

[54] LAMINATED INSULATION

[75] Inventors: Masakazu Hasegawa; Michio Takaoka; Syotaroh Yoshida; Kazuya Akashi, all of Tokyo, Japan

[73] Assignee: Fujikura Ltd., Tokyo, Japan

[21] Appl. No.: 857,504

[22] Filed: Apr. 21, 1986

Related U.S. Application Data

[63] Continuation of Ser. No. 732,810, May 10, 1985, abandoned, which is a continuation of Ser. No. 476,760, Mar. 18, 1983, abandoned.

[30] Foreign Application Priority Data

Mar. 19, 1982 [JP] Japan ................................. 57-44907

[51] Int. Cl.⁴ .......................... B32B 3/10; B32B 27/10
[52] U.S. Cl. ................................ 428/140; 156/251; 156/293; 156/309.9; 428/198; 428/511; 428/537.5
[58] Field of Search .............. 428/148, 140, 132, 511, 428/537.5; 156/251, 293, 309.9

[56] References Cited

U.S. PATENT DOCUMENTS

| 3,671,284 | 6/1972 | Uhrig | 428/198 X |
| 3,715,251 | 2/1973 | Prentice | 428/198 X |
| 4,229,473 | 10/1980 | Elber | 428/198 X |
| 4,313,984 | 2/1982 | Moraw et al. | 428/140 X |
| 4,378,296 | 3/1983 | Urai et al. | 428/198 |
| 4,400,422 | 8/1983 | Smith | 428/198 X |

Primary Examiner—Thomas J. Herbert
Attorney, Agent, or Firm—Sughrue, Mion, Zinn, Macpeak & Seas

[57] ABSTRACT

A laminated insulation paper of the type having two cellulose layers separated by a plastic layer is formed with through holes in the plastic layer such that the respective cellulose layers may contact one another through the through holes. The insulation paper is formed by pressing heated, rounded pins into one of the cellulose layers while backing the other layer until the two cellulose layers are contacted through the hole thus formed in the plastic layer.

13 Claims, 3 Drawing Sheets

LAMINATED INSULATION

This is a continuation of application Ser. No. 732,810 filed May 10, 1985, now abandoned, which is a continuation of application Ser. No. 476,760 filed Mar. 18, 1983 now abandoned.

BACKGROUND OF THE INVENTION

In FIG. 1A, there is shown a conventional laminated insulation paper 30, used as a low-loss insulation paper for an electric power cable, which paper is integrally formed of two cellulose papers 10 and 12 and a film-like plastic sheet 20 sandwiched therebetween.

In the cable insulation assembly using the laminated insulation paper 30 thus constructed, oil flow resistance in the radial direction is undesirably very large.

Under this circumstance, it has been proposed to provide through holes 22 in the plastic sheet 20 as shown in FIG. 1B. An example of such a construction is disclosed in British Patent 1,057,744. In the cable insulation assembly using a tape with the above through holes thus constructed, the through holes 22 undesirably form oil gaps, where the gap length d in the electric field direction is equal to the thickness of the plastic sheet 20, to thereby cause an electrical defect.

Further, the conventional laminated insulation paper 30 having the plastic sheet 20 with the through holes 22 has been made in a manner such that, at first, through holes 22 are provided in the plastic sheet 20 as shown in FIG. 1(C); cellulose papers 10 and 12 are then laminated on the front and back surfaces of the plastic sheet 20 respectively, and are then passed through a pair of heat rollers 40 and 42 to thereby integrally form the three layers.

In such a case, however, the plastic sheet 20 is heated by the heat rollers up to near its melting point and is pressed by the heat rollers, and therefore the through holes 22 have been apt to be crushed.

SUMMARY OF THE INVENTION

The object of the present invention is to provide a laminated insulation paper having a plastic portion with through holes and a method of making the same, the laminated insulation paper having about the same reduction effect on the oil flow resistance as the tape with through holes shown in FIG. 1(B), and less electric defect, and further with no fear of crushing the through holes 22 by means of the plastic sheet per se.

DETAILED DESCRIPTION OF THE PREFERRED EMBODIMENTS

Figure 2:
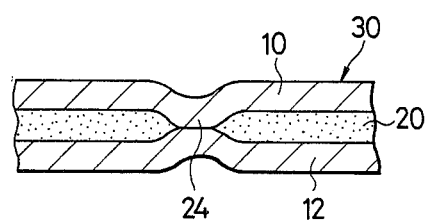
FIG. 2 is a view for explaining the construction of the present invention.

Referring now to FIG. 2, the construction of the present invention will be hereinafter explained. In FIG. 2, the laminated insulation paper 30 is characterized in that:

(1) There are provided through holes 24 in the plastic sheet 20;

(2) The through holes 24 are blocked by at least one of the two cellulose papers 10 and 12; and (3) The two cellulose papers are closely contacted by means of the through holes 24.

Figure 3:
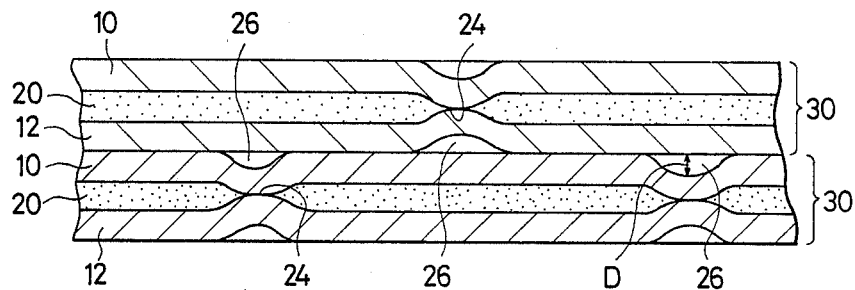
FIG. 3 is a schematic view showing a cable insulation assembly.

FIG. 3 shows an example of a cable insulation layer made by winding the laminated insulation paper 30 thus constructed.

Figure 1A:
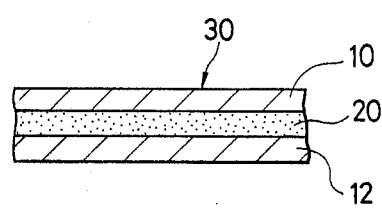
FIG. 1A is a cross-sectional view for explaining a conventional laminated insulation paper.
Figure 1B:
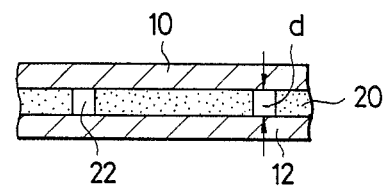
FIG. 1B is a similar view of a laminated insulation paper having a plastic sheet with through holes.
Figure 1C:
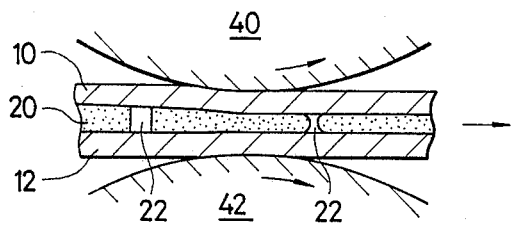
FIG. 1C is a view illustrating a conventional method of making a laminated insulation paper.

As mentioned above, the through holes 24 per se are filled by the cellulose papers 10 and 12, and therefore no oil gap is formed. However, oil gaps 26 are formed at recessed portions 26 of the papers 10 and 12. The length D in the electric field direction is half of the thickness of the plastic sheet 20, and therefore is half of the length of the oil gaps due to the through holes shown in FIG. 1B. This achieves a similar effect as where the length of the oil gaps in the electric field direction produced at a contact portion when a thin tape is wound are made small, to thereby reduce the electrical defect.

Figure 4:
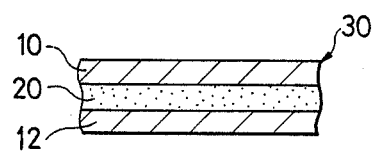
FIGS. 4, 5, 6 and 7 are views illustrating steps in the construction of the present invention.

Referring to the construction of the invention, the method of making the laminated insulation paper is characterized by the following steps:

(1) At first, a laminated insulation paper 30 is provided which is integrally formed with two cellulose papers 10 and 12 and a film-like plastic sheet 20 therebetween, as shown in FIG. 4.

Figure 5:
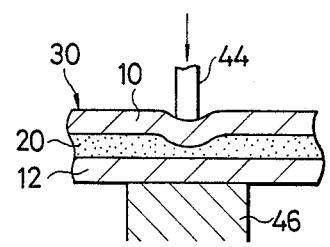

(2) A heated cylindrical pin 44, the end point of which is rounded, is pressed onto at least one of the cellulose papers 10 and 12 to produce a recess in and to heat and melt a portion of the plastic sheet 20 through the cellulose paper 10, as shown in FIG. 5.

Figure 6:
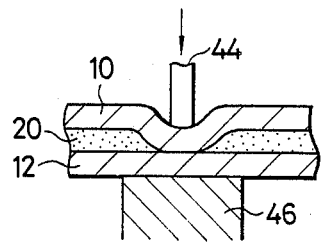
Figure 7:
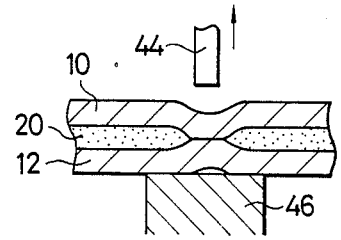

(3) The pin 44 is further depressed to the extent that the cellulose paper 10 contacts the opposite cellulose paper 12 as shown in FIG. 6, and is then stopped and pulled from the cellulose paper 10 as shown in FIG. 7.

Thus, the melted plastic sheet 20 is pressed and the plastic displaced and the heated pin 44 then removed to thereby form a through hole in the plastic sheet 20. In the through holes of the plastic sheet 20 the cellulose papers are closely contacted with each other. Insulating oil can flow into the laminated insulation paper 30 through the contacted portion of the cellulose papers.

FIG. 7 shows the state of the laminated insulation paper in which the cellulose paper 12, as well as the cellulose paper 10, has risen upwardly by the resiliency of the cellulose paper 10 per se after the pin 44 is removed from the upper paper.

In FIGS. 5 to 7, numeral 46 designates a supporting base for the laminated insulation paper 30. It is preferable for the operation of the providing the through holes to maintain the supporting base at a predetermined temperature slightly lower than that of the melting temperature of the plastic sheet 20.

Figure 8:
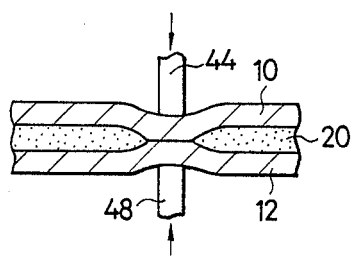
FIG. 8 is a view showing another method of making a laminated insulation paper according to the present invention.

Further, it may be preferable to press the laminated insulation paper simultaneously with an upper heated pin 44 and a lower heated pin 48, as shown in FIG. 8, for example.

Figure 9:
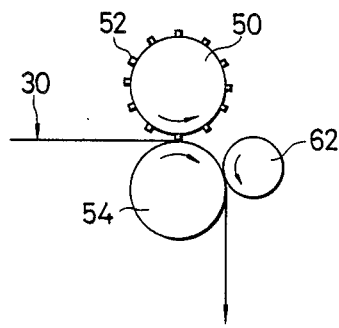
FIGS. 9 and 10 are views of an embodiment of an apparatus using the present invention.
Figure 10:
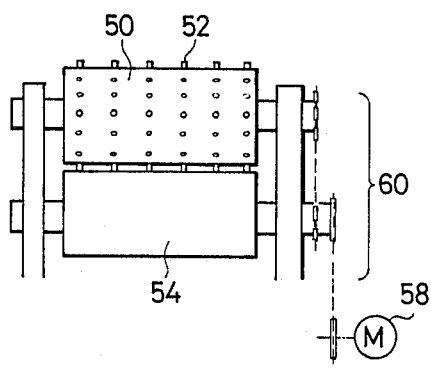
Figure 11:
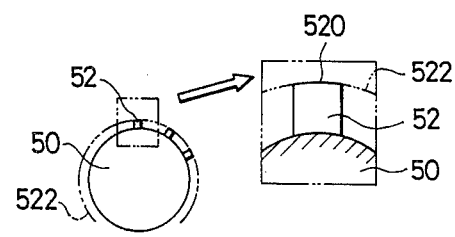
FIG. 11 is an enlarged view of features appearing in FIG. 10.

Referring to FIGS. 9 and 10, an embodiment of an apparatus for providing the through holes will be explained. Heated rollers 50 and 54 having the same diameter are uniformly rotated by an electric motor 58 and a well-known chain drive mechanism 60. The heated roller 50 has a plurality of pins 52 corresponding to the pin 44 mentioned above. The pins 52 have dimensions of about 0.8 mm in diameter, about 0.5 mm in length and a cylindrical formation. The outer surface 520 of the pin 52 is formed in such a manner that it is composed of a portion of an outer surface 522 of a cylindrical body coaxial to the heated roller 50. The temperature of the heated roller 50 is maintained at a predetermined temperature slightly higher than the melting temperature of the plastic sheet 20, and the temperature of the heated roller 54 is maintained at a predetermined temperature slightly lower than the melting temperature thereof. Numeral 62 designates a pinch roller.

When the synthetic insulation paper 30 shown in FIG. 4 is passed through the heated rollers 50 and 54, the through holes mentioned above are provided in the plastic sheet 20 by the pins 52.

Figure 12:
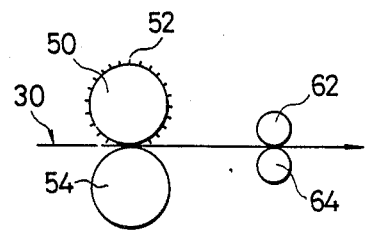
FIGS. 12, 13 and 15 are views of different apparatuses using the present invention.

In FIG. 12, a driving roller 64 is additionally provided, and the moving speed of the laminated insulation paper 30 between the driving roller 64 and the heated rollers 50 and 54 is made adjustable.

Figure 13:
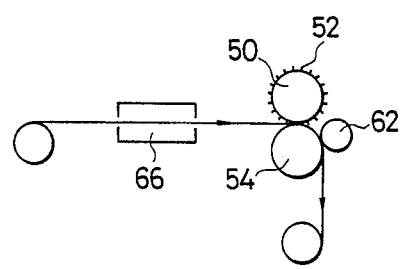

Referring to FIG. 13, an alternative embodiment is illustrated, wherein a preheating device 66 is preferably provided for the laminated insulation paper 30.

Figure 14:
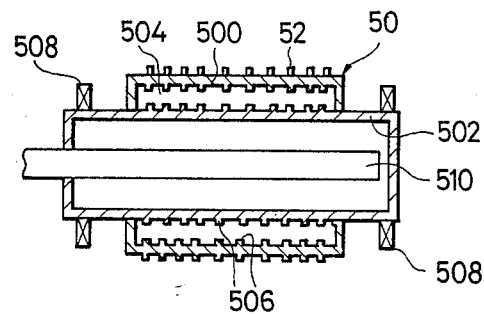
FIG. 14 illustrates a method of heating the heated roller 50.

FIG. 14 shows a method of heating the heated rollers 50 or 54. In particular, the heated rollers are composed of a heat pipe. Namely, a space 504 is provided between the outer wall 500 and an axle 502 and a composition such as one of diphenyl and diphenyl oxide is enclosed in the space 504 as a heat medium. Numeral 506 designates fins, and the pins 52 are formed at positions corresponding to the fins 506, respectively. The inner surface of the axle 502 is oxided. Numerals 508 designate bearings and 510 designates a heater such as a sheath heater or an induction heater.

Thus constructed, the axle 502 is heated by the heater 510 to thereby heat the outer wall 500 due to the operation of the heat pipe. According to the above configuration, the temperature distribution in the longitudinal direction on the outer surface of the heated roller 50 becomes uniform, and as a result the provision of holes in the plastic sheet 20 with uniform dimensions can be achieved.

Figure 15:
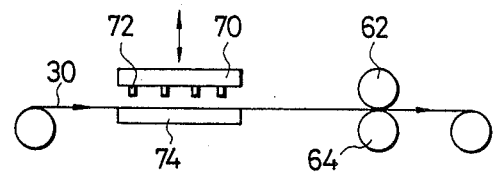

FIG. 15 shows an example utilizing heat plates 70 and 74, with numeral 72 designating pins. In this case, the laminated insulation paper 30 is intermittently moved, and is pressed by the pins 72 during the stopped state of the same. The other operations of this example are the same as that of the embodiment described above.

As stated above, according to the invention, an effect of reducing the oil flow resistance in the radial direction can be obtained without increasing the electrical defect in an electric cable.

Further, according to the invention, a laminated insulation paper having a plastic portion formed with through holes can be made without introducing a problem such as the filling of the through holes by the plastic sheet per se.

What is claimed is:

1. A laminated insulation paper, comprising; an integral construction of two sheets of cellulose paper and a film-like plastic sheet sandwiched therebetween, through holes locally provided in said plastic sheet formed by contact with a heated pin, at least one of said two sheets of cellulose paper being pressed into said through holes by said pin to fill said through holes, said two sheets of cellulose paper directly contacting with each other by means of said through holes.

2. An article as claimed in claim 1, wherein said through holes are formed only in said plastic sheet, indentations being provided on at least one of said cellulose paper sheets in correspondence with said through holes whereby inner surfaces of said two cellulose paper sheets are contacted with one another.

3. A method of making a laminated insulation paper including a plastic portion formed with through holes, comprising; pressing a heated pin against at least one of two sheets of cellulose paper comprising said laminated insulation paper, which paper is integrally formed of said two sheets of cellulose paper and a film-like plastic sheet sandwiched there-between, heating and melting said plastic sheet through said cellulose paper to form through holes in said plastic sheet at a portion corresponding to the position of said pin, and pressing by said pin until a portion of at least one of said cellulose sheets beneath said pin directly contacts the other said cellulose sheets.

4. A method as claimed in claim 3, further including preheating said synthetic insulation paper prior to said pressing.

5. A method as claimed in claim 3, further comprising transporting said synthetic insulation paper away from a station where said pressing is carried out at a selectible speed.

6. A method as claimed in claim 3, including simultaneously pressing a plurality of said heated pins against one of said sheets.

7. A method as claimed in claim 6, wherein said pins are maintained at a temperature above the melting temperature of said plastic sheet.

8. A method as claimed in claim 6, said pins being supported on a plate, and said synthetic insulation paper being supported on a heated plate.

9. A method as claimed in claim 6, further including backing said laminated insulation paper during said pressing.

10. A method as claimed in claim 9, wherein the temperature of said backing is maintained below the melting temperature of said plastic sheet.

11. A method as claimed in claim 6, said pins being rounded and disposed on a rotatable roll.

12. A method as claimed in claim 11, further including backing said synthetic insulation paper during said pressing with a heated backing roller.

13. A method as claimed in claim 11, wherein said rotatable roll comprises a heat pipe for uniformly transmitting heat to said plurality of pins.

* * * * *